3,086,063
PURIFICATION OF m-DINITROMONOCYCLIC
ARYL COMPOUNDS
Charles J. Lind, Hamburg, and Allen W. Sogn, Williamsville, N.Y., assignors to Allied Chemical Corporation, New York, N.Y., a corporation of New York
No Drawing. Filed June 1, 1961, Ser. No. 114,030
7 Claims. (Cl. 260—645)

This invention relates to the purification of m-dinitromonocyclicaryl compounds. More particularly it relates to a novel method for the purification of metadinitrobenzene and metadinitrotoluene. It is especially directed to the separation of trace amounts of isomeric dinitrobenzenes from mixtures of metadinitrobenzene therewith.

The preparation of metadinitro derivatives of the benzene series by nitration of the corresponding benzene or mononitrobenzene usually is accompanied by the simultaneous formation of the isomeric ortho and para dinitro bodies. The presence of such impurities in the metadinitro compounds is, in general, undesirable for, for the most part, the dinitro compound is reduced to the corresponding diamine. The presence of even trace amounts of isomeric diamines, particularly para, results in a metadiamine of poor stability, the original white crystalline product becoming dark and tarry in a matter of weeks, even on standing in a closed container at room temperature. The instability of such meta diamines containing trace amounts or more of isomeric diamines is especially noticeable when exposed to air, elevated temperatures and sunlight.

It is known to treat metadinitrobenzene containing isomers with an aqueous sulfite and thus to effect substantially complete removal of the isomers from the metadinitrobenzene. It has been found, however, that even the trace amounts of isomers which are not removed by this process are sufficient to seriously affect the stabiilty of the diaminobenzene produced from sulfite treated metadinitrobenzene.

Metaphenylenediamine of high purity and acceptable stability has been prepared by treating in aqueous media the crude diamine with heavy metal salts, especially chromium salts. The isomeric diamines are more readily converted to their insoluble addition complexes of these heavy metal salts and thus are rendered removable from the metaphenylenediamine. By this method, however, substantial losses of the desired meta compound are incurred, and hence this procedure leaves something to be desired.

An object of this invention, therefore, is to devise an effective method of separating isomeric dinitromonocyclicaryl compounds from metadinitromonocyclicaryl compounds.

Another object is to devise an improved process for the separation of isomeric dinitrobenzenes from metadinitrobenzene and metadinitrotoluene.

A specific object is to provide metadinitrobenzene substantially free from trace quantities of isomeric dinitrobenzene and from which metaphenylene diamine, which is stable for extended periods to light, heat and air, can be obtained.

These and other objects will be apparent from the following description of our invention.

It has now been found, in accordance with the present invention, that metadinitromonocyclicaryl compounds, e.g. meta dinitrobenzene, metadinitrotoluene and the like, can be freed of isomeric dinitro compounds by suspending a crude metadinitromonocyclicaryl compound contaminated with isomeric dinitro compounds, generally trace amounts of isomeric dinitro compounds, in a substantial quantity of water, i.e. at least part for part by weight of dinitro compound preferably between 1.25 and 2 parts by weight water per part by weight of dinitro compound, heating the mixture to above the melting point of the m-dinitro compound in the presence of a small amount of surfactant, generally about 0.5 percent to 1 percent, by weight of dinitro compound, agitating the molten dinitro compound aqueous surfactant solution until at least the major amount of the molten dinitro compound has been emulsified in the water, cooling the emulsion so formed to a temperature below the melting point of the m-dinitro compound to solidify purified m-dinitro compound, and separating the purified m-dinitro compound from the aqueous menstruum. By this process, purified m-dinitromonocyclic aryl compounds are obtained which on reduction yield the corresponding diamines possessing improved stability to light, heat and air.

In accordance with a preferred mode of carrying out our invention, metadinitrobenzene containing relatively minor amounts of isomeric dinitrobenzenes, especially a product which has been treated with bisulfite, is suspended in about 1.7 parts of water by weight of dinitro compound, and containing .005 part of "Tween 60" (a product of Atlas Powder being polyoxyethylene sorbitan monooleate) and a like quantity of "Pluronic L62" (a high molecular condensation product of ethylene oxide/propylene oxide and propylene glycol). This mixture is agitated and heated to about 90° to 95° C. and maintained thereat for about 15 to 20 minutes. The emulsified mass is then cooled to about 30° C. and the resultant solidified material is separated from the aqueous liquor in any convenient manner, as by filtration, centrifugation, sucking off the liquor through a screened vacuum leg and the like. The procedure may be repeated to obtain a still additional improvement in the separation of the isomeric dinitro compounds. The m-dinitrobenzene thus obtained contained no significant amounts of isomeric dinitrobenzenes and when reduced to the corresponding phenylenediamine gave a practically white product which was practically unchanged after storage for 4 weeks at 45° to 50° C. By contrast, bisulfite treated m-dinitrobenzene still contained appreciable quantities of isomeric dinitro compounds, gave on reduction to the diamine a practically white product, which on being stored for 4 weeks at 25° C., turned black and tarry, the material giving off an ammoniacal odor. Industry today is more demanding and insistent on receiving a diamine which on storage is stable and will not discolor. The conventional bisulfite treatment will remove most of the isomeric dinitro compounds in the crude metadinitro product but unfortunately leaves trace amounts, a fraction of a percent of the isomeric dinitro compounds which heretofore could only be removed by a drastic treatment with heavy metal salts with consequent high cost and considerable loss of desired product. While we do not predicate our invention on any theory, we believe under the condition of operation in accordance with the present process there is a selective emulsification of the ortho and para dinitro bodies and their retention in the aqueous menstruum.

The amount of water which is used in this process is not critical and hence can be varied over a considerable range. Sufficient water should be used to provide a slurry which is easily and rapidly agitated so that the treated dinitro compound on cooling does not set to a solid mass but rather provides sufficient heat transfer medium to effect the production of articulate grains. Preferably at least about part for part by weight of water and dinitro compound is used and especially the amount of water should be between 1.25 and 2 parts by weight. Larger amounts of water, 5 parts or more, can be used but such is not preferred mainly because of the expense of heating and cooling such larger quantities of water. If desired part of the water can be replaced by an organic solvent such as ethyl alcohol, acetone, benzene, nitrobenzene, chlorobenzene n-hexane, toluene and the like but generally such solvents are not needed.

The temperature at which the emulsification step is carried out also can be varied over a large range. The minimum temperature is that at which the dinitro compound is molten and the maximum temperature is the boiling temperature of the mass. Preferably the temperature used is at least 90° and especially 95° to 98° C. at atmospheric pressure. Higher temperatures can be obtained by means of elevated pressures but in the usual case, such higher pressures require the provision of autoclaves which are expensive to obtain and maintain. Accordingly, such conditions and equipment unless necessary to carry out the process are not to be preferred.

Once the mixture is heated to the desired temperature and the dinitro body has become molten, the mass should be agitated at this point for a time sufficient to emulsify the molten dinitro body in the aqueous surfactant solution. The more efficient the agitation is at this point in the process the less time will be required. Generally, about 15 minutes to 1 hour will be sufficient for this part of the process. The time required will of course depend on the amount of isomers present in the m-dinitro compound, the temperature of the mass and the rate of agitation.

Following the emulsification step, the mixture is cooled to solidify the dinitro body. This cooling should be preferably done slowly and with agitation in order to prevent breaking of the emulsion of the impurties and "throwing out of solution" of said impurities; solidification of the meta-dinitro compound in a finely divided state which is difficult to separate from the aqueous liquor; and caking of the dinitro body on the sides of the equipment, especially on the cooling surfaces. Of course, once the mass has been cooled to below the freezing point of the meta-dinitro body, the cooling rate can be increased as desired.

Surfactants [1] are well known surface active agents and include those of the non-ionic, cationic and anionic groups. The preferred surfactants are of the non-ionic type and especially preferred are those which are polyoxyalkylene derivatives of the partial esters of long chain fatty acids and hexahydric alcohols. The preferred non-ionic surfactants are characterized by containing as the hydrophilic portion of the molecule a plurality of oxyalkylene moieties as illustrated by the following:

(1) Polyoxyethylene derivatives of hexitol anhydride or sorbitol fatty esters such as "Tween 60"—polyoxyethylene sorbitan monooleate, "Tween 80"—polyoxyethylene sorbitan monostearate.

(2) High molecular weight condensation products of alkylene oxides and alkylene glycols, such as "Pluronic L62," the polyoxyethylene condensation product with propylene glycol.

(3) 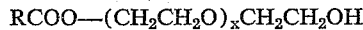 $R-O-(CH_2CH_2O)_x-CH_2-CH_2OH$ wherein R is an alkyl group having from 12 to 22 carbon atoms or an alkyl phenol residue wherein the alkyl group contains from 6 to 13 carbon atoms (all ranges being inclusive of the limits) and wherein $x$ is at least 4 especially between about 6 and about 40.

[1] See page 3 et seq., "Surface Active Agents and Detergents," vol. II. Published 1958. Interscience Publishers.

Examples of products in this group include "Triton X-100" wherein R is an alkyl phenol residue and the alkyl group is isooctyl and X is 7 to 9; "Triton X-102" wherein R is isooctyl phenol and X is 11; "Tergitol NPX" wherein R is ethylhexyl phenol and X is 8 to 9; "Neutionic 600," wherein R is nonyl phenol and X is 9; "Emulphor ELN" wherein R is dodecyl phenol and X is 19.

(4) Condensation products of fatty acids and polyethylene glycols having the general formula

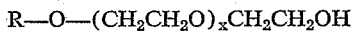
$$RCOO-(CH_2CH_2O)_xCH_2CH_2OH$$

wherein R is a long chain alkyl group having from 12 to 18 carbon atoms and $x$ is an integer from 8 to 40.

(5) Polyoxyethylene ethers of the formula $$R-O-(CH_2CH_2O)_xCH_2CH_2OH$$

wherein R is an alkyl group having from 6 to 18 carbon atoms and $x$ is an integer from 4 to 40. A commercial product of this group is "Brij 30" in which R is lauryl and $x$ is about 10.

Although one surfactant need be employed in the process, mixtures of these surfactants can sometimes be used with advantage. If unusually pure products be desired the procedure may be repeated one or more times to insure high purity.

Anionic surfactants such as highly sulfated fatty acid esters, e.g. lauryl sulfate ("Tetranols"), lauryl sulfosuccinate ("Aerosol OT"), alkyl aryl sulfonate, e.g. dodecylbenzene sulfonate, kerylbenzene sulfonate and cationics such as quaternary ammonium compounds ("Sapamine KN, Ethoquad 18/12"), fatty acid esters of oxazolines ("Alkaterge C," prepared as described in U.S.P 2,504,951) can also be used. Such compounds, while suitable, are less preferable than the non-ionic type for reasons which include tendency to foaming.

The amount of surface active agent required is relatively small. As little as 0.05% by weight of the crude dinitro body is sufficient to provide a noticeable improvement in the setting point of the m-dinitro compound. In general about 0.5% to 1% is preferred since at concentrations of more than 2% there is increased tendency to foaming and filtration becomes more difficult.

A rough or crude method of determining the effectiveness of the removal of isomeric dinitro compounds from metadinitro monocyclic aryl compounds can be followed by the improvement in the setting point of the purified material. A more sensitive test for the presence of o/p dinitrobenzene in m-dinitrobenzene is the so-called "Formapon" test. The test is conducted as follows:

About 1 to 2 g. of the meta-dinitrobenzene are placed in a dry test tube and 10 cc. of ethyl alcohol and 1 g. of Formapon (sodium formaldehyde sulfoxylate) are added. About 2 cc. of aqua ammonia are used to rinse down the walls of the test tube which then is heated in a boiling water bath. The mixture is boiled for about 1 minute and the color is noted. About 10 cc. of water are added and once again the color is noted.

Any purple color which develops even upon dilution of the test solution is indicative of significant amounts of impurities such that the metadinitrobenzene upon reduction to m-phenylenediamine will not produce a stable product.

A brown color is indicative of a doubtful product, that is the stability of the m-phenylenediamine produced from metadinitrobenzene giving such a test result cannot be predicated with certainty. Such a product should be submitted to at least one subsequent purification.

Pure metadinitrobenzene gives, in this test, a light yellow color which becomes white on dilution.

Pure orthodinitrobenzene gives a deep blue color which is unaffected by dilution with water.

Pure paradinitrobenzene gives a brownish-red color which is almost unchanged by dilution.

It is recommended, and hence preferred, to use as the crude dinitro material, compositions which have been treated to remove isomeric dinitro compounds to the most convenient extent. Thus we prefer to operate our process with metadinitrobenzene which has been treated by the known bisulfite procedure to remove all but trace amounts of isomeric dinitro toluenes. These trace amounts are sufficient to render the metaphenylenediamine and metatolylenediamine unstable on storage but which can be conveniently removed by the process of our invention.

The following examples will illustrate the process of our invention. Parts and percentages are by weight and temperatures are in degrees centigrade.

EXAMPLE 1

Crude metadinitrobenzene having a setting point of 78.5° was treated in the conventional manner with sodium bisulfite. The setting point of the bisulfite treated metadinitrobenzene obtained was 89.8° and this product gave a purple color in the Formapon test described previously, which is indicative of the presence of a significant amount of isomeric dinitrobenzenes.

In accordance with the present invention 798.7 parts of the treated metadinitrobenzene was suspended in 1665 parts of cold water and 5 parts of polyoxyethylene sorbitan monooleate "Tween 60" and 2 parts of sodium keryl benzene sulfonate "Nacconol NR" were added. The mixture was agitated and heated to 90° to 95°, agitated at that temperature for 15 to 20 minutes, then cooled while being agitated to about 30°, the supernatant liquor was removed through a screened dip leg and the process repeated using like quantities of water and surfactants. The purified material was transferred to a vacuum filter and washed thereon with about 20,000 parts of water. The washed crystals were dried in air.

The recovery of metadinitrobenzene was 792 parts (99+ percent recovery) having a setting point of 89.93°. The Formapon test produced a light yellow color turning white on dilution with water, indicating the absence of any significant quantity of isomeric dinitrobenzenes.

Reduction of this regrained material in a known manner to m-phenylenediamine, gave a product having a S.P. 62.92°. Samples of this diamine were stored at 25° and at 45° to 50° for four weeks with practically no change in color.

Reduction of the bisulfite treated material, but which had not been subjected to the purification procedure of the present invention as described in the above example, gave m-phenylenediamine of a setting point of 62.8°. Samples of this diamine stored at 25° and at 45° to 50° turned black and tarry after 4 weeks.

EXAMPLE 2

Repetition of the purification treatment of bisulfite treated m-dinitrobenzene as described in Example 1 above, except that in place of 5 parts of "Tween 60" and 2.5 parts of "Nacconol NR," 3 parts of "Tween 60" were used. Recovery of the improved m-dinitrobenzene was 99% of the amount treated, the setting point was 89.95° and on being treated by the Formapon test, gave a light greenish yellow color turning white on dilution with water.

EXAMPLE 3

Repetition of the procedure of Example 1 using crude m-dinitrobenzene of setting point 81.0° prior to bisulfite treatment, and subjecting the bisulfite treated material to two purifications in which no surfactant was used gave a material which had a setting point of 86.2° and which by the Formapon test gave a dark reddish brown color turning purple on dilution with water. This result showed the presence of appreciable quantities of isomeric dinitrobenzenes.

EXAMPLE 4

Crude m-dinitrobenzene was treated with sodium bisulfite in a conventional manner to remove a major part of the isomeric dinitrobenzenes. 478 parts of the bisulfite treated m-dinitrobenzene containing small amounts of isomeric dinitrobenzene was suspended in 1000 parts of water and to the slurry 0.59 part of "Tween 60," polyoxyethylene sorbitan monooleate, 0.59 part of "Pluronic L62," a high molecular condensation product of ethylene oxide/propylene oxide and propylene glycol, and 0.59 part of "NAT-3," trisodium ethylene diamino tetraacetate. The mixture was heated to 95° to 98° and maintained thereat for about 10 minutes while vigorously agitating. The agitated mass was cooled to about 60° in air and then to 40° in a cold water bath. The aqueous liquor was removed through a vacuum dip leg and the purifying process repeated exactly as before. The thus purified m-dinitro-benzene was transferred to a vacuum filter and washed thereon with 12,000 parts of cold water. The washed crystals were dried in air. The purified product had a setting point 89.95° and gave in the Formapon test a light yellow to light tannish yellow color which on dilution with water turned to milky white. This product was reduced to m-phenylenediamine of setting point of 62.95° to 63.1°, and was stable when stored at 45° to 50° for three weeks.

EXAMPLE 5

The effect of increasing amounts of surfactant, e.g. "Tween 60" on the purity of m-dinitrobenzene is demonstrated by the following series of runs carried out substantially as described in Example 4 above, except that the amount of "Tween 60" was varied as indicated in Table I below.

Table I

| Run | Percent Tween 60 (based wt. of DNB) | Setting Pt. of DNB, degrees | Formapon test |
| --- | --- | --- | --- |
| 1 | 0.005 | 89.2 | Purple. |
| 2 | 0.05 | 89.6 | Repeat purification treatment. |
| 3 | 0.5 | 89.95 | Lt. greenish yellow. |
| 4 | 1.0 | 89.95 | Do. |
| 5 | 2.0 | 89.95 | Do. |
| 6 | 5.0 | 90.1 | Very light greenish yellow. |

Run 1 using a relatively small amount of "Tween 60" gave unsatisfactory results. In run 2 the amount of "Tween 60" is at about the minimum. A pure product could be obtained by repeating the purification operation. As can be seen, increasing the amount of surfactant also increases the setting point of the dinitrobenzene but an amount of "Tween 60" above about 2 percent was found to increase the tendency to foam. It was found that this tendency to foam could be reduced by the use of a mixture of surfactants as for example, "Pluronic L62" used in conjunction with "Tween 60" is effective in reducing the foam characteristic of runs made with larger amounts of "Tween 60" alone.

EXAMPLE 6

To a solution of 3 parts of Tween 60 in 1000 parts of water, 587 parts of m-dinitrotoluene, S.P. 68°, were added. The slurry was heated to 90° to 95° and agitated vigorously thereat for 20 minutes. The resulting emulsion was agitated while being cooled slowly to 25° to 30°. The aqueous liquor was removed through a vacuum dip leg and the purification process repeated. The resultant crystals were filtered on a vacuum filter and washed thereon with about 12,000 parts of cold water. The washed crystals were dried in air.

The dried product weighed 558 parts (95.2% recovery) and had a setting point of 69.95°. In the Formapon test, the product gave a very light yellow solution with a faint greenish tinge which turned white on dilution with water. The original material gave a dark reddish brown color which turned purple on dilution.

This product was reduced to m-tolylenediamine (S.P.

97.75°) in 88.4% yield which diamine was stable, i.e., its original color was substantially unchanged after storage for three weeks in a 45° to 50° oven.

The original material on reduction to m-toluylene diamine (88.2% yield, S.P. 95.95°) turned very dark brown after 3 days in a 45° to 50° oven.

It can thus be seen that an effective and economical process has been devised for the removal of trace amounts of isomeric dinitro compounds from metadinitromonocyclic aryl compounds. It is to be understood however that the above examples are purely illustrative and that many variations in the specific details of said examples can be made without departing from the scope of our invention as will be obvious to those skilled in this art.

For example other m-dinitromonocyclic aryl compounds than m-dinitrobenzene and m-dinitrotoluene can be purified by the process of our invention. Our invention is applicable to compounds of the general formula

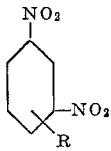

wherein R is hydrogen or alkyl containing from 1 to 6 carbon atoms. Such compounds include the following m-Dinitrobenzene
2,4-dinitrotoluene
2,6-dinitrotoluene
2,4-dinitroethylbenzene
2,4-dinitropropylbenzene
2,6-dinitro-t-butylbenzene
3,5-dinitroisoamylbenzene
2,4-dinitro-n-hexylbenzene Although certain preferred embodiments of the invention have been disclosed for purpose of illustration, it will be evident that various changes and modifications may be made therein without departing from the scope and spirit of the invention.

We claim:
1. A process for the purification of meta-dinitromonocyclic aryl compounds admixed with dinitro compounds which are isomers of said meta-dinitro compounds which comprises suspending a meta-dinitromonocyclic aryl compound having the formula

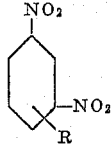

wherein R represents a member of the group consisting of hydrogen and an alkyl group containing 1-6 carbon atoms contaminated with dinitro compounds which are isomers of said meta-dinitro compound in a substantial quantity of water of at least part for part by weight of dinitro compound to provide a slurry of dinitro compound in water, heating the mixture to above the melting point of the m-dinitro compound in the presence of a small amount of surfactant of at least about 0.05 percent by weight of the m-dinitro compound, agitating the molten m-dinitro compound aqueous surfactant solution until at least the major amount of the molten dinitro compound has been emulsified in the water, cooling the emulsion so formed to a temperature below the melting point of the m-dinitro compound to solidify purified m-dinitro compound, and separating the purified m-dinitro compound from the aqueous menstruum.

2. A process as claimed in claim 1 wherein the amount of surfactant is between about 0.5% to about 1%.

3. A process as claimed in claim 1 wherein the meta-dinitromonocyclic aryl compound to be purified is meta-dinitrobenzene.

4. A process as claimed in claim 1 wherein the meta-dinitromonocyclic aryl compound to be purified is meta-dinitrotoluene.

5. A process as claimed in claim 1 wherein the surfactant is of the non-ionic type and is a polyoxyalkylene derivative of a partial ester of a long chain fatty acid and hexahydric alcohol characterized by containing as the hydrophilic portion of the molecule a plurality of oxyalkylene moieties.

6. A process as claimed in claim 1 wherein a plurality of surfactants are employed.

7. A process for the production of stable meta-diaminomonocyclic aryl compounds from meta-dinitromonocyclic aryl compounds admixed with dinitro compounds which are isomers of said meta-dinitro compounds which comprises suspending a meta-dinitromonocyclic aryl compound having the formula

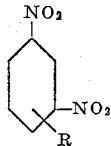

wherein R represents a member of the group consisting of hydrogen and an alkyl group containing 1–6 carbon atoms contaminated with dinitro compounds which are isomers of said meta-dinitro compound in a substantial quantity of water of at least part for part by weight of dinitro compound to provide a slurry of dinitro compound in water, heating the mixture to above the melting point of the m-dinitro compound in the presence of a small amount of surfactant of at least about 0.05 percent by weight of the m-dinitro compound, agitating the molten m-dinitro compound aqueous surfactant solution until at least the major amount of the molten dinitro compound has been emulsified in the water, cooling the emulsion so formed to a temperature below the melting point of the m-dinitro compound to solidify purified m-dinitro compound, separating the purified m-dinitro compound from the aqueous menstruum and reducing the thus purified m-dinitromonocyclic aryl compound to the corresponding diamine.

References Cited in the file of this patent

Sugihara et al.: J. Organic Chemistry, vol. 21, pp. 1445–1447 (1956).

Vogel: "A Text-book of Practical Organic Chemistry," published by Longmans, Green and Co. Inc., 55 Fifth Avenue, New York 3, New York (1948), p. 128, sec. II, 31 relied upon.